United States Patent
Kidokoro

(10) Patent No.: US 7,205,734 B2
(45) Date of Patent: Apr. 17, 2007

(54) CONTROL DEVICE FOR VEHICULAR OPENING/CLOSING BODY

(75) Inventor: Hitoshi Kidokoro, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 512 days.

(21) Appl. No.: 10/495,043

(22) PCT Filed: Jul. 10, 2003

(86) PCT No.: PCT/JP03/08757

§ 371 (c)(1),
(2), (4) Date: May 11, 2004

(87) PCT Pub. No.: WO2004/018817

PCT Pub. Date: Mar. 4, 2004

(65) Prior Publication Data

US 2005/0012482 A1    Jan. 20, 2005

(30) Foreign Application Priority Data

Aug. 22, 2002 (JP) .......................... 2002-241845

(51) Int. Cl.
*H02P 1/00* (2006.01)
*H02P 1/22* (2006.01)
*H02P 1/40* (2006.01)
*H02P 3/00* (2006.01)
*H02P 3/20* (2006.01)

(52) U.S. Cl. ................. 318/268; 318/461; 318/609; 318/610

(58) Field of Classification Search ............. None
See application file for complete search history.

(56) References Cited

U.S. PATENT DOCUMENTS

| 4,558,265 A | 12/1985 | Hayashida et al. |
| 4,763,052 A | 8/1988 | Lundin et al. |
| 5,434,487 A * | 7/1995 | Long et al. ............... 318/286 |
| 6,137,255 A * | 10/2000 | Skalski ..................... 318/687 |
| 6,359,762 B1 | 3/2002 | Yokomori |
| 7,038,413 B2 * | 5/2006 | Onozawa et al. ........... 318/443 |
| 7,073,291 B2 * | 7/2006 | Kawanobe et al. ............ 49/26 |
| 2006/0137250 A1 * | 6/2006 | Imai et al. ................... 49/360 |

FOREIGN PATENT DOCUMENTS

| EP | 0 381 314 A2 | 8/1990 |
| EP | 0 566 747 A1 | 10/1993 |
| JP | 2000-127764 A | 5/2000 |

* cited by examiner

*Primary Examiner*—Lincoln Donovan
*Assistant Examiner*—Erick Glass
(74) *Attorney, Agent, or Firm*—Foley & Lardner LLP

(57) ABSTRACT

A control device for a vehicular opening/closing body is provided with a duty ratio calculator (78), which calculates a duty ratio when power supplied to a door drive motor (48) allowing an opening/closing body to open/close is subjected to duty control based on a result of adding first second multiplication values, the first multiplication value being obtained by multiplying a speed difference between a target opening/closing body speed and an actual opening/closing body speed by a negative proportional gain, and the second multiplication value being obtained by multiplying an integral value of the speed difference by an integral gain.

9 Claims, 11 Drawing Sheets

FIG.14

| DOOR POSITION (FROM PROPERLY SHUT POSITION) | VL−V≦−2 | | | -2<VL−V & VL−V<10 | | | 10<VL−V | | |
|---|---|---|---|---|---|---|---|---|---|
| | 10mm | 300mm | 600mm | 10mm | 300mm | 600mm | 10mm | 300mm | 600mm |
| ω | 2 | 1 | 2 | 2 | 1 | 2 | 2 | 0.4 | 2 |
| K1 | 4 | 1 | 4 | 4 | 1 | 4 | 4 | 0.16 | 4 |
| K2 | 3 | 1 | 3 | 3 | 1 | 3 | 3 | −0.2 | 3 |
| K3 | 0 | 0 | 0 | 0 | 0 | 0 | 0 | 0.75 | 0 |

| | -2<VL−V & VL−V<10 | 10<VL−V |
|---|---|---|
| | 300mm | 300mm |
| ω | 0.5 | 0.4 |
| K1 | 0.25 | 0.16 |
| K2 | 0 | −0.2 |
| K3 | 0.7 | 0.75 |

CONTROL DEVICE FOR VEHICULAR OPENING/CLOSING BODY

TECHNICAL FIELD

The present invention relates to a control device for a vehicular opening/closing body, which is provided in a vehicle and controls a speed of the vehicular opening/closing body opening/closing, for example, when an occupant gets on/off the vehicle.

BACKGROUND ART

Heretofore, a power slide door system has been known, which opens/closes a slide-type door mechanism provided in a vehicle by a drive force of a motor. This type of control device for opening/closing a vehicle slide door, which automatically opens/closes the vehicle slide door by driving the motor, is provided with a revolution number detection unit for detecting a revolution number of the motor. A technology of calculating a moving speed of the slide door based on a revolution number of the motor per predetermined time, which is detected by the revolution number detection unit, and of controlling the drive force of the motor, for example, a duty ratio in a PWM (Pulse Width Modulation) control based on the calculated moving speed of the slide door and a target moving speed is disclosed in Japanese Patent Laid-Open Publication 2000-127764.

In the technology described above, when the speed of the slide door is lowered more than a determining speed VJ, which is lower than a target speed VL by a predetermined value, the fact that a state where the speed of the slide door is lowered more than the target speed VL by more than the predetermined value (VL-VJ) continues is represented by a count of rotation pulse signals of the drive motor. Then, when the number of the counts reaches a value at which the above-described continuous state is determined, the duty ratio (d) of the drive motor is increased. A value calculated as an increment Δd is set relatively small, and for example, may be 2%. According to this disclosed technology, they say, by performing the above-described control, a radical increase of motor torque can be avoided even if pinching occurs, and the speed of the slide door can be made to coincide with the target speed irrespective of a load change.

DISCLOSURE OF INVENTION

However, in the above-described technology, in the case where the pinching occurs and the actual speed of the slide door is lowered, the duty ratio of the drive motor has been increased though a value thereof has been small. Therefore, the torque of the drive motor has been increased though a value thereof has been small, leading to a problem of an inevitable increase of a pinching load.

In this connection, the present invention was created in consideration of the foregoing problem. It is an object of the present invention to provide a control device for a vehicular opening/closing body, which reduces a pinching load even if the speed of the opening/closing body is lowered due to an occurrence of pinching.

In order to attain the foregoing object, a control device for a vehicular opening/closing body includes an actual speed detecting unit for detecting an actual opening/closing body speed which is an actual opening/closing speed of the vehicular opening/closing body provided in a vehicle, a target speed generating unit for generating a target opening/closing body speed which is a target opening/closing speed of the vehicular opening/closing body, a duty ratio calculating unit for obtaining a speed difference between the target opening/closing body speed generated by the target speed generating unit and the actual opening/closing body speed detected by the actual speed detecting unit, and for calculating, by use of the obtained speed difference, a duty ratio when power supplied to a motor driving to open/close the vehicular opening/closing body is subjected to duty control, and a gain setting unit for setting a gain for use in calculating the duty ratio by the duty ratio setting unit, wherein the duty ratio calculating unit calculates the duty ratio based on an addition result obtained by adding a first multiplication value in which the speed difference is multiplied by a proportional gain and a second multiplication value in which an integral value of the speed difference is multiplied by an integral gain, and a third multiplication value in which the actual opening/closing body speed is multiplied by a feedback gain.

According to the present invention, against radical load variations of the opening/closing body due to the pinching and the like, the reduction of the pinching load can be achieved by lowering the actual speed of the opening/closing body to an extent enough to avoid the influence of the load.

BRIEF DESCRIPTION OF DRAWINGS

FIG. 14 is a view showing Table 1 representing a relationship between a value of each gain and each door opening/closing position.

BEST MODE FOR CARRYING OUT THE INVENTION

Embodiments of the present invention will be described below with reference to the drawings.

Figure 1:
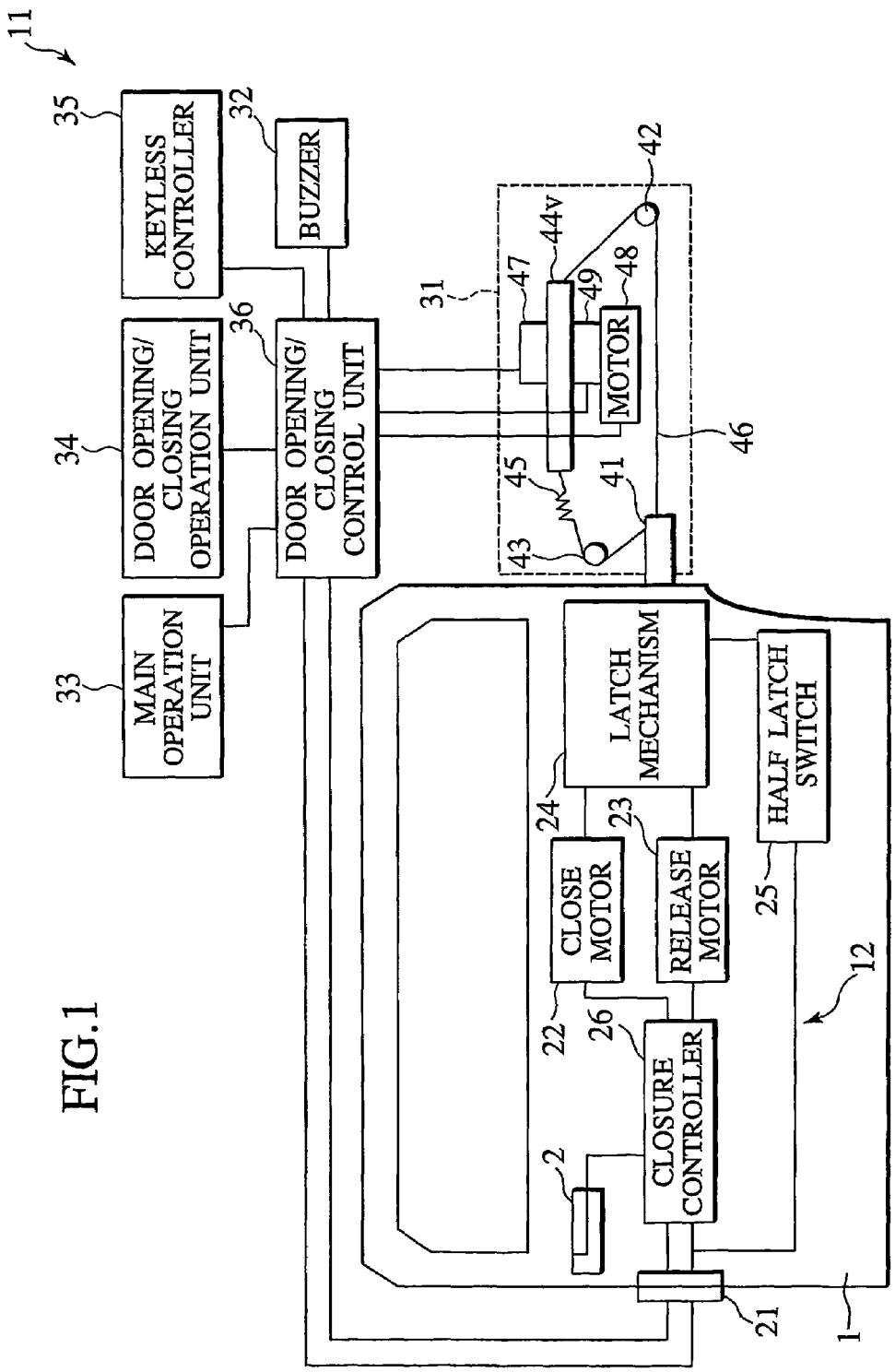
FIG. 1 is a diagram showing a configuration of a control device for a vehicular opening/closing body according to an embodiment of the present invention.

For example, the present invention is applied to a slide door control system configured as shown in FIG. 1.

This slide door control system is provided with the slide door opening/closing system 11 for controlling drives to open/close the slide door 1 in a range from a half shut position (half latched position) to a fully open position, and the door closure system 12 which is provided in the slide door 11 for controlling a drive of the slide door 1 in a range from the half shut position (half latched position) to a properly shut position (full latched position).

In this slide door control system, a control domain of the slide door 1, which is controlled by the slide door opening/closing system 11, ranges from a position where a half shut state is detected (half latched position) to the fully open position. This range is equal to a range from a domain out of the control of the door closure system 12 to the fully open position.

The door closure system 12 is composed by including the feeding connector 21 connected to an unillustrated battery, the close motor 22, the release motor 23, the latch mechanism 24, the half latch switch 25, and the closure controller 26 connected to the door handle 2.

Upon detecting that the slide door 1 reaches the half latched position, the half latch switch 25 supplies a half latch detection signal to the closure controller 26.

Meanwhile, the latch mechanism 24 is driven by torque generated by the close motor 22. Then, the latch mechanism 24 is fastened with an unillustrated striker provided on the slide door 1 to set the slide door 1 from the half shut state to the properly shut state. On the other hand, the latch mechanism 24 is driven by torque generated by the release motor 23. Then, the latch mechanism 24 releases the fastening with the unillustrated striker provided on the slide door 1 to set the slide door 1 from the properly shut state to an open state.

The closure controller 26 receives an operation input signal of the door handle 2, a half latch detection signal, and an operation input signal from the door opening/closing control unit 36, which is described later, to control the operation of latch mechanism 24. This closure controller 26 detects that the slide door 1 is operated to an open state by the operation of the door handle 2 by a user.

In addition, in the case where this closure controller 26 recognizes that the slide door 1 is in the open state, the closure controller 26 supplies power from the feeding connector 21 to the close motor 22 in response to the recognition that the slide door 1 reaches the half latched position by the half latch switch 25 and in response to a receipt of a signal instructing the slide door 1 to be set in the properly shut state. Thus, the closure controller 26 allows the close motor 22 to generate torque. In such a way, the closure controller 26 allows the latch mechanism 24 to operate, thus setting the slide door 1 in the properly shut state.

Furthermore, in the case where the closure controller 26 recognizes that the slide door 1 is in the properly shut state, the closure controller 26 supplies power from the feeding connector 21 to the release motor 23 in response to a receipt of a signal from the later-described door opening/closing operation unit 34 or keyless controller 35 through the door opening/closing control unit 36. Thus, the closure controller 26 allows the release motor 23 to generate torque. In such a way, the closure controller 26 allows the latch mechanism 24 to operate, thus setting the slide door 1 in the open state and locating the same slide door 1 in an opening direction more than the half latched position by reaction force of a weatherstrip. In this state, the slide door 1 is located at the region controlled by the slide door opening/closing system 11.

The slide door opening/closing system 11 is provided with the door drive unit 31 connected to the slide door 1, the buzzer 32, the main operation unit 33, the door opening/closing operation unit 34, the keyless controller 35, and the door opening/closing control unit 36 for controlling these described units.

For example, the main operation unit 33 and the door opening/closing operation unit 34 are disposed at positions operatable by a user aboard a vehicle. These main operation unit 33 and door opening/closing operation unit 34 supply the operation input signals to the door opening/closing control unit 36 in accordance with the operation by the user.

The door opening/closing operation unit 34 is provided with a switch for generating the operation input signal which instructs the start of the opening operation of the slide door 1, and a switch for generating the operation input signal which instructs the start of the closing operation of the slide door 1. This door opening/closing operation unit 34 supplies the operation input signals to the door opening/closing control unit 36 in accordance with the operations of the respective switches.

The main operation unit 33 is provided with a switch for generating a signal which permits and inhibits the control of the slide door control system. The main operation unit 33 supplies a permission signal or an inhibition signal to the door opening/closing control unit 36 in accordance with the operation of the unit.

The keyless controller 35 receives a radio signal transmitted from a portable remote controller by an operation of a switch provided thereon, generates an operation input signal from the radio signal, and supplies the generated operation input signal to the door opening/closing control unit 36.

The buzzer 32 rings in response to a drive signal from the door opening/closing control device 36, thus informing the user of the operation of the slide door 1.

The door drive unit 31 includes the door connecting mechanism 41, the pulleys 42 and 43, the drum mechanism 44, the spring mechanism 45, all of which are connected through the wire 46. In addition, this door drive unit 31 includes the pulse encoder 47 for detecting the operation of the drum mechanism 44 and generating a door drive pulse for the slide door 1, the door opening/closing drive motor 48 for generating torque by which the slide door is driven to open/close, and the clutch mechanism 49 for connecting/disconnecting the door opening/closing drive motor 48 and the drum mechanism 44.

Figure 2:
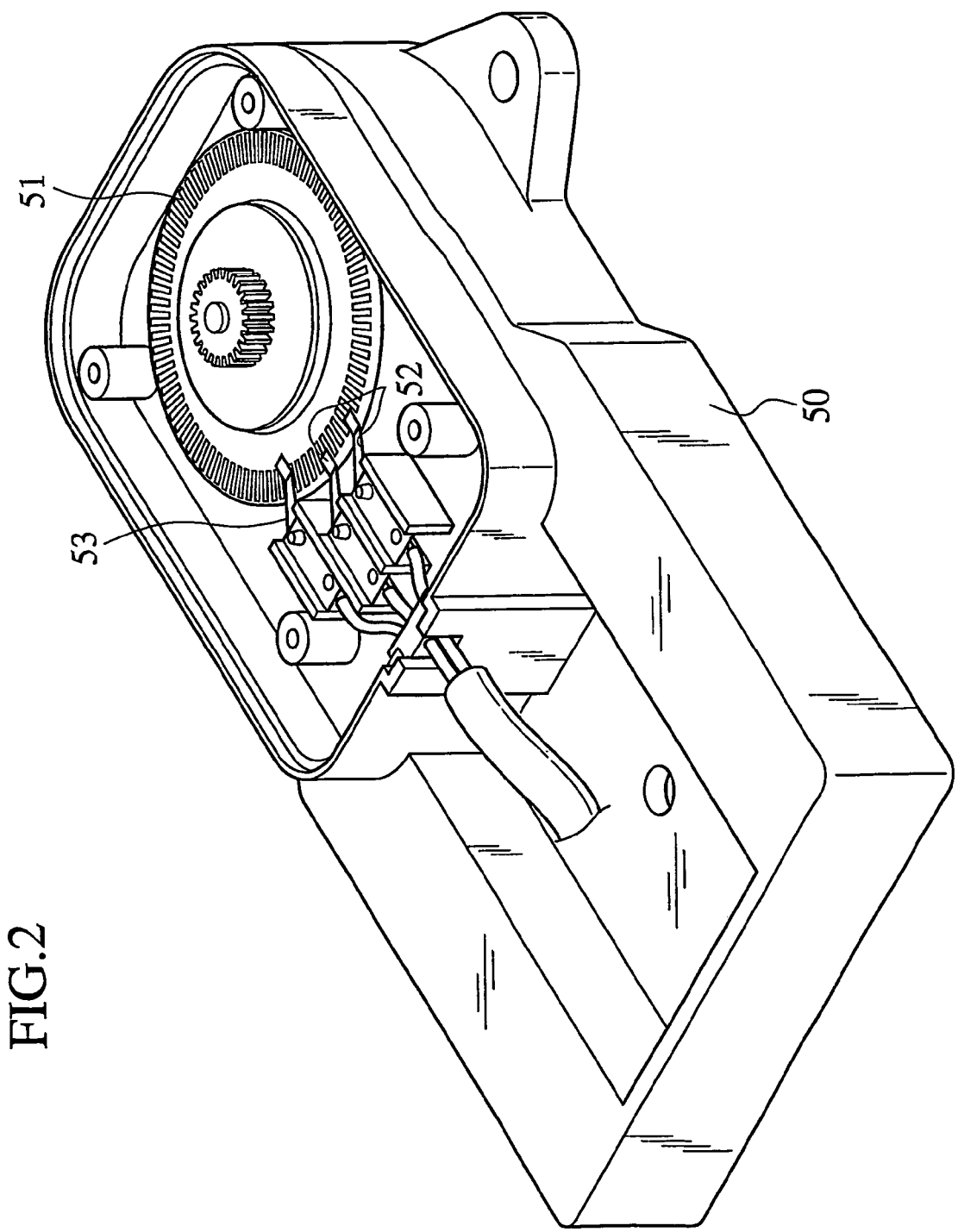
FIG. 2 is a perspective view of a front face of a pulse encoder.
Figure 3:
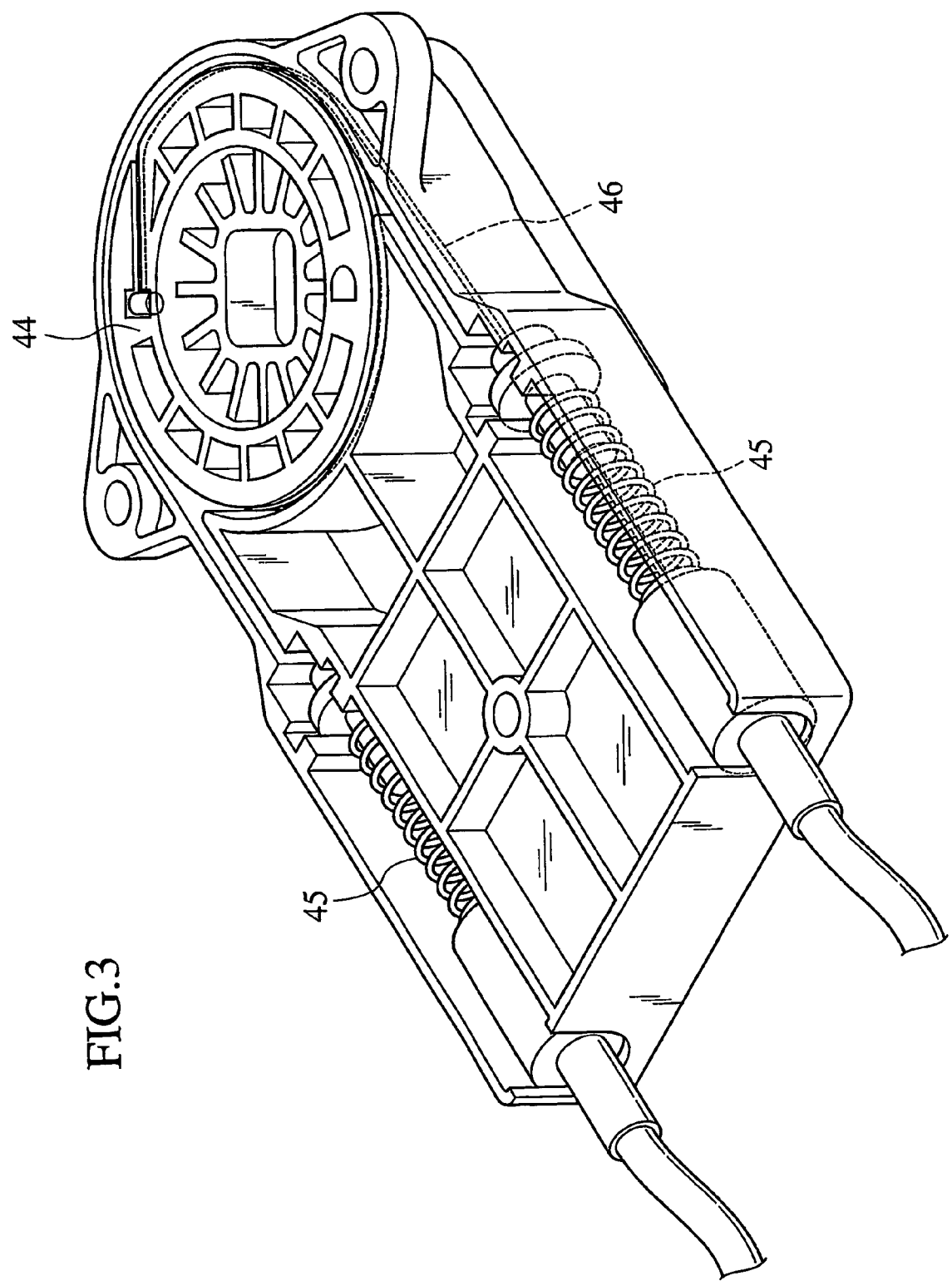
FIG. 3 is a perspective view of a back face of the pulse encoder.

The door drive unit 31 is configured as shown in FIGS. 2 and 3, which are perspective views partially showing front and back faces thereof. As shown in FIG. 3, the door drive unit 31 includes the wire 46 connected to the slide door 1, the drum mechanism 44 of which side face is wound around by the wire 46, and the spring mechanism 45 for maintaining the wire 46 at a certain tension, all of which are housed in the case 50. When the door opening/closing drive motor 48 rotates, the drum mechanism 44 rotates by torque thereof, thus winding up and releasing the wire 46. The drum mechanism 44 performs operation of winding up and releasing the wire 46, thus allowing the slide door 1 to operate in the opening or closing direction.

Moreover, as shown in FIG. 2, as the pulse encoder 47, the door drive unit 31 includes the rotating electrode plate 51, which is connected adjacent to the center axis of the drum mechanism 44 and has electrodes formed thereon at a predetermined interval, two rotation detection terminals 52 in contact with the portions of the rotating electrode plate 51, where the electrodes are formed, and the grounding terminal 53. The drum mechanism 44 rotates by the torque of the door opening/closing drive motor 48, and thus the rotating electrode plate 51 is rotated, and the rotation detection terminals 52 are brought into contact with the respective electrodes. The pulse encoder 47 generates the door drive pulse in response to the above-described electrical contact. Thus, the pulse encoder 47 supplies the door drive pulse in accordance with the opening/closing operation of the slide door 1 to the door opening/closing control unit 36. This door drive pulse generated by the pulse encoder 47 has a frequency in response to the moving speed of the slide door 1 because the door opening/closing drive motor 48 and the pulse encoder 47 are configured to be connected adjacent to each other. Note that, though the mechanical encoder as described above has been used in this embodiment, for example, an optical encoder and the like may be used instead.

Figure 4:
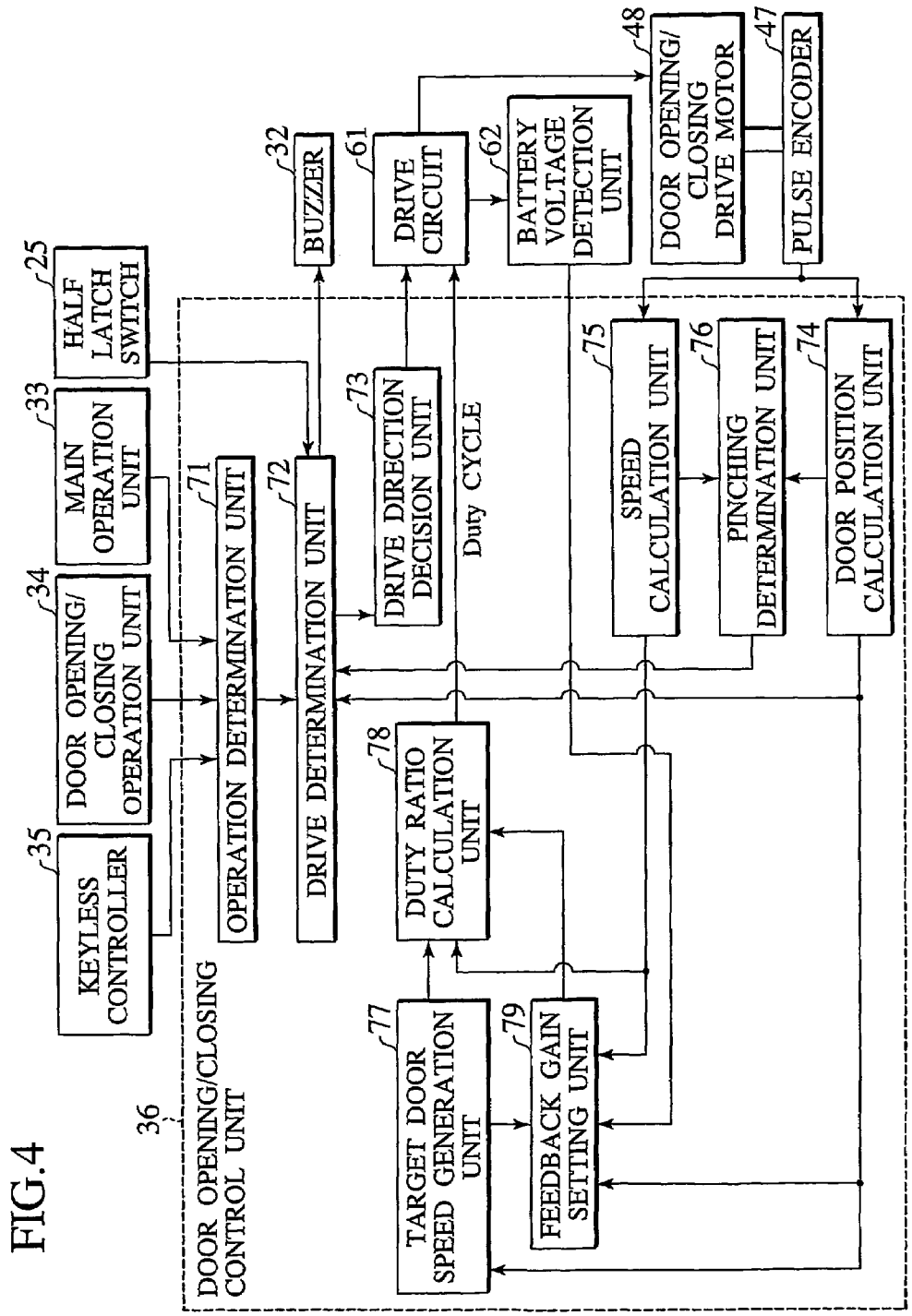
FIG. 4 is a block diagram showing a functional configuration of a door opening/closing control unit.

The door opening/closing drive motor 48 is supplied with power of which duty ratio is controlled from the drive circuit 61 shown in FIG. 4. Then, the door opening/closing drive motor 48 generates torque in response to the duty ratio. Thus, the door opening/closing drive motor 48 rotationally drives the drum mechanism 44 through the clutch mechanism 49, thus driving the slide door 1.

Furthermore, as shown in FIG. 4, the drive circuit 61 and the battery voltage detection unit 62 are connected to the door opening/closing control unit 36.

The drive circuit 61 is connected to an unillustrated battery and provided with a duty ratio signal sent from the door opening/closing control unit 36 and with a control signal indicating the drive direction of the door opening/closing drive motor 48. This drive circuit 61 supplies a driving current to the door opening/closing drive motor 48 in accordance with the duty ratio signal and the control signal. Thus, the drive circuit 61 rotationally drives the door opening/closing drive motor 48 in the opening or closing direction of the slide door 1.

The battery voltage detection unit 62 is connected to an unillustrated in-vehicle battery, and detects a battery voltage supplied from the battery to the drive circuit 61. This battery voltage detection unit 62 supplies the detected battery voltage to the door opening/closing unit 36.

FIG. 4 is a functional block diagram showing the configuration of the door opening/closing control unit 36. In FIG. 4, the door opening/closing control unit 36 includes the door opening/closing operation unit 34, the operation determination unit 71 receiving the operation input signal from the main operation unit 33, the drive determination unit 72 receiving a half latching detection signal from the half latch switch 25, the drive direction decision unit 73, the door position calculation unit 74 receiving the door drive pulse from the pulse encoder 47, the speed calculation unit 75, the pinching determination unit 76, the target door speed generation unit 77, the duty ratio calculation unit 78, and the feedback gain setting unit 79.

The door position calculation unit 74 receives the door drive pulse and calculates the door position. For example, this door position calculation unit 74 holds a numerical value "300" as door position information when the slide door 1 is located at the fully open position. Then, upon receiving the door drive pulse by the movement of the slide door 1 from the fully open state to the closing direction, the door position calculation unit 74 calculates the door position information by performing subtraction from the numerical value "300." This door position calculation unit 74 supplies the calculated door position information to the pinching determination unit 76, the drive determination unit 72 and the target door speed generation unit 77.

The speed calculation unit 75 receives the door drive pulse from the pulse encoder 47 and calculates the cycle of the door drive pulse, and thus calculates the actual moving speed of the slide door 1 and generates actual moving speed information. Then, the speed calculation unit 75 supplies the generated actual moving speed information to the pinching determination unit 76, the duty ratio calculation unit 78 and the feedback gain setting unit 79.

The pinching determination unit 76 detects pinching of a foreign object in the slide door 1 based on the door position information and the actual moving speed information. Upon detecting the pinching of a foreign object, this pinching determination unit 76 supplies a pinching detection signal to the drive determination unit 72.

Upon receiving the operation input signals from the door opening/closing operation unit 34 and the main operation unit 33, the operation determination unit 71 determines the operation contents of the door opening/closing operation unit 34 and main operation unit 33, and supplies an operation content determination signal to the drive determination unit 72.

The drive determination unit 72 recognizes the operation contents of the user based on the operation content determination signal from the operation determination unit 71. In addition, upon receiving the half latching detection signal from the half latch switch 25, the drive determination unit 72 recognizes that the slide door 1 is in the half shut state. In this half shut state, the drive determination unit 72 recognizes that the position of the slide door 1 is out of the range controlled by the slide door opening/closing system 1 but in the range controlled by the door closure system 12. Thus, the drive determination unit 72 comes in a state of not controlling the operation of the slide door 1. Furthermore, the drive determination unit 72 is connected to the door position calculation unit 74 and the pinching determination unit 76, and provided with the door position information and the pinching detection signal therefrom.

The drive determination unit 72 determines the drive contents of the slide door 1 and buzzer 32 based on the received signals, and supplies the drive signal to the buzzer 32 and the drive content signal indicating the drive contents of the slide door 1 to the drive direction decision unit 73.

Upon receiving, from the operation determination unit 71, the operation content determination signal instructing the moving direction of the slide door 1 to be inverted, the drive determination unit 72 first supplies a drive content signal instructing a motor brake to be applied to the drive direction decision unit 73. Subsequently, the drive determination unit 72 supplies, to the drive direction decision unit 73, a drive content signal instructing the slide door 1 to be inversely moved after the elapse of a predetermined period since the application of the motor brake.

The drive direction decision unit 73 determines the drive direction of the door opening/closing drive motor 48 in accordance with the drive content signal from the drive determination unit 72, and supplies the control signal controlling the relay state of the drive circuit 61.

The target speed generation unit 77 stores target speeds in accordance with the door positions as a map in advance. The target speed generation unit 77 receives the door position information from the door position calculation unit 74, selects a target speed as a target of the slide door 1 from the map in accordance with a door position, generates target speed information, and supplies the generated target speed information to the duty ratio calculation unit 78 and the feedback gain setting unit 79.

The feedback gain setting unit 79 sets an integral gain, a proportional gain, a feedforward gain and the like for generating the torque necessary for the door opening/closing drive motor 48 based on the battery voltage detection signal, the door position information, the target speed, and the actual moving speed. Then, the feedback gain setting unit 79 supplies the set gain to the duty ratio calculation unit 78.

The duty ratio calculation unit 78 performs an arithmetic operation to be described later so as to set the actual door speed at the target door speed based on the respective gains set by the feedback gain setting unit 79.

Then, the duty ratio calculation unit 78 generates a duty cycle signal indicating a duty ratio at which the torque necessary for the door opening/closing drive motor 48 is generated, and supplies the generated duty cycle signal to the drive circuit 61.

Figure 5:
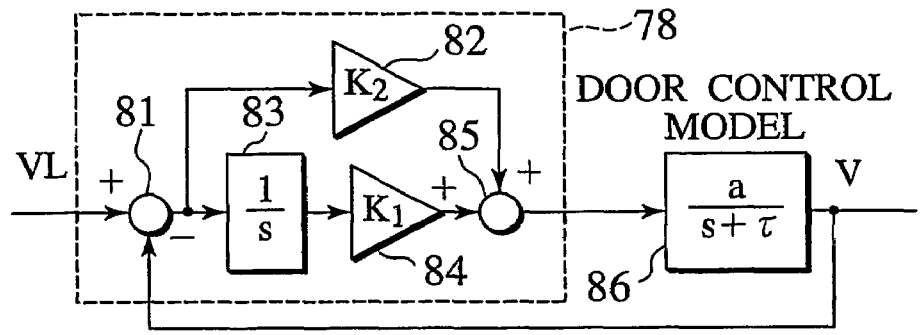
FIG. 5 is a diagram showing a configuration of a control system by a negative feedback control, including a duty ratio calculation unit, according to a first embodiment of the present invention.

FIG. 5 is a diagram showing a configuration of a control system including the duty ratio calculation unit 78 according to the first embodiment of the present invention, the control system performing negative feedback control based on a speed difference between the target door speed VL and the actual door speed V. In FIG. 5, the duty ratio calculation unit 78 includes the first adder 81 receiving the target door speed and a negative value of the actual door speed, the proportional gain operational unit 82, the integration operational unit 83, the integral gain operational unit 84, and the second adder 85 adding the output of the proportional gain operational unit 82 and the output of the integral gain operational unit 84 to supply the duty cycle signal indicating the duty ratio. In the duty ratio calculation unit 78, the proportional gain of the proportional gain operational unit 82 and the integral gain of the integral gain operational unit 84 are set by the feedback gain setting unit 79. In FIG. 5, the duty cycle signal supplied from the second adder 85 is provided to the door control model 86, and thus the actual door speed V is obtained. This door control model 86 is represented so as to be approximated to an expression (1) to be described later.

When the target door speed and the actual door speed are provided to the duty ratio calculation unit 78, the actual door speed is subtracted from the target door speed by the first adder 81. A result of the subtraction is integrated by the integration operational unit 83, and is multiplied by a negative proportional gain (K2) by means of the proportional gain operational unit 82. The output of the integration operational unit 83 is multiplied by an integral gain (K1) by means of the integral gain operational unit 83. A result of the multiplication is added to the output of the proportional gain operational unit 82 in the second adder 85. A result of the addition is supplied as the duty cycle signal to the drive circuit 61.

In the first embodiment of the present invention, the duty ratio calculation unit 78 described above is provided. Thus, when the actual door speed V is lowered more than the target door speed VL, the duty ratio is not increased by a value proportional to (VL-V), but the duty ratio is reduced. Specifically, in the case of configuring the control system performing usual negative feedback control as shown in FIG. 5, in which a predetermined gain is multiplied by the difference between the target door speed VL and the actual door speed V, a negative value is used for the proportional gain K2 in place of a positive value for use in usual control. The first embodiment of the present invention is characterized in this matter.

When the proportional gain K2 is set negative, it is impossible that the actual door speed V coincides with the target door speed VL for variations of a load. Therefore, in the duty ratio calculation unit 78 shown in FIG. 5, the value obtained by integrating (VL-V) by the integration operational unit 83 is multiplied by the predetermined integral gain K1. A value obtained by the multiplication is added to the value obtained by multiplying (VL-V) by the negative proportional gain K2.

In the case where the actual door speed is radically lowered due to the occurrence of pinching and the like, the duty ratio is reduced in proportion to the lowering of the actual door speed owing to the effect of the negative proportional gain K2. Thus, the lowering of the actual door speed is accelerated, thus making it possible to attain a significant lowering of the pinching load. Meanwhile, for a load which is increased/decreased because the vehicle is located on a slope and so on, the integral value is sufficiently increased with the elapse of time since such a load is not a load radically varied. In such a way, the motor torque is increased, and the actual door speed V is made to coincide with the target door speed VL.

Next, in the door opening/closing control unit 36 configured as above, the responsiveness of the door opening/closing drive motor 48 by the respective gains set in the duty ratio calculation unit 78 will be described.

When the door opening/closing drive motor 48 to be controlled is a direct current motor, a relationship between a battery voltage supplied from the drive circuit 61 and the actual moving speed is approximated (modeled) as characteristics of a first-order lag as represented in the following Expression 1.

$$a/(s+\tau) \qquad (1)$$

where $\tau$ is a constant, and a is also defined as a constant for simplifying the explanation though this a is a function depending on a battery voltage subjected to duty control. Specifically, the actual door speed in a stationary state is proportional to the ratio of duty applied to the door opening/closing drive motor 48.

Figure 6:
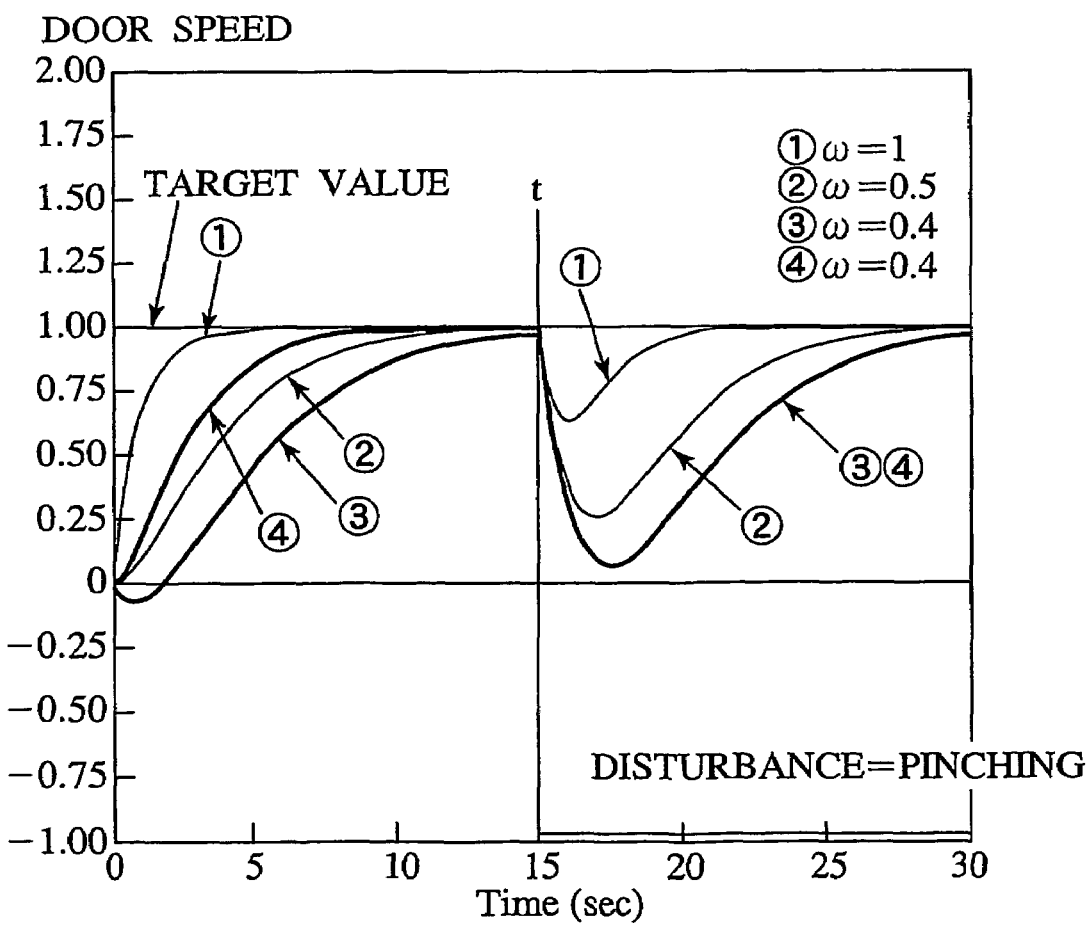
FIG. 6 is a graph showing target responsiveness and responsiveness of disturbance with respect to an actual door speed.

As shown in FIG. 5, the duty ratio calculation unit 78 configures a PI (proportional-integral) control system. For example, if the control system has the integral gain K1 equal to 1 and the proportional gain K2 equal to 1 and the door control model represented by Expression 1 has $\tau$ equal to 1 and a equal to 1, then responsiveness thereof to the target value and responsiveness to a disturbance, that is, to the pinching, are shown by the circled number 1 of FIG. 6. FIG. 6 is a graph showing an actual door speed in the case where the door starts to move from a stopped state and a disturbance (pinching) occurs in fifteen seconds from the start of movement. The responsiveness shown by the circled number 1 of FIG. 6 is one representing characteristics in which a closed loop pole $\omega$ given by the following Expression 2 becomes 1. The damping coefficient $\zeta$ is given by the following Expression 3.

$$\omega^2 = K1 \qquad (2)$$

$$\zeta = (\tau + K2)/(2 \times \omega) \qquad (3)$$

Here, as $\omega$ becomes smaller and smaller, the responsiveness to the disturbance is lowered. Specifically, it takes more time for the actual door speed to be recovered by overcoming the disturbance. Therefore, when the integral gain K1 and the proportional gain K2 are selected so as to obtain characteristics, for example, in which $\omega$ becomes equal to 0.5, K1 becomes equal to 0.25 and K2 becomes equal to 0 by the above-described Expressions (2) and (3). Note that a too small damping coefficient $\zeta$ brings a vibratory response and a too large damping coefficient $\zeta$ brings a too dull response. Therefore, Expression (3) is solved under the condition where $\zeta$ becomes equal to 1.

Figure 7:
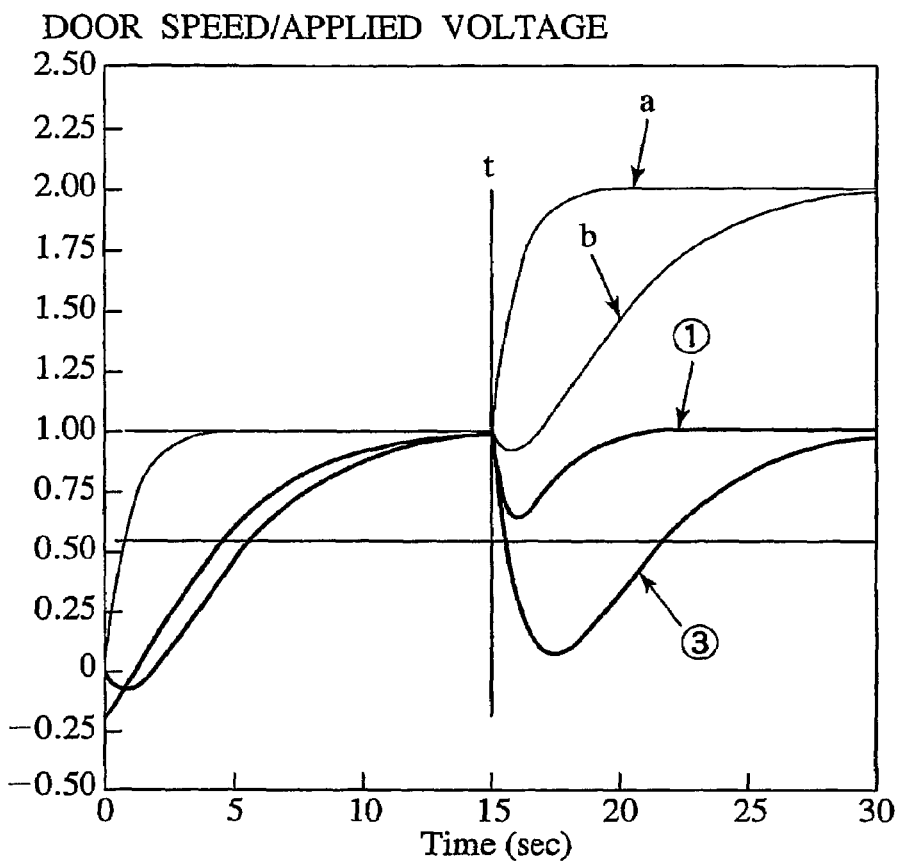
FIG. 7 is a graph showing response characteristics of door speed/applied voltage.

Characteristics in this case become as shown by the circled number 2 of FIG. 6. Furthermore, if $\omega$ is set equal to 0.4, then K2 cannot help being set at a negative value, that is, −0.2 as given by the foregoing Expression (3). Hence, when K2 is set equal to −0.2 and K1 is set equal to 0.16, as shown in FIG. 7, the voltage in the case where $\omega$ is set equal to 1 is raised immediately after the occurrence of the pinching as shown by the line a of FIG. 7. This raised voltage will increase the pinching load. On the other hand, when $\omega$ is set equal to 0.4, the voltage is gradually increased after being lowered once, thus making it possible to contribute to the lowering of the pinching load as shown by the line b of FIG. 7.

In the first embodiment described above, the proportional gain K2 for the difference between the target door speed VL and the actual door speed V is set negative, and the integral gain K1 for the integral value of the difference therebetween is set positive. In such a way, for the radical load variations due to the pinching and the like, the door drive force is positively reduced, and the lowering of the actual door speed, which is more than the influence of the load, is realized, thus making it possible to attain the reduction of the pinching load. Meanwhile, it is possible to realize a door control system capable of making the actual door speed V coincide with the target door speed VL for the gentle load variations due to a slant of the vehicle, variations in frictional force of a door rail and the like.

Figure 8:
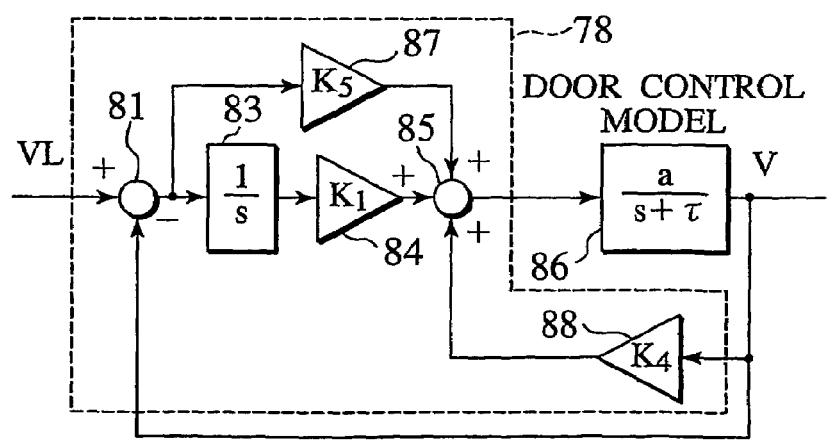
FIG. 8 is a diagram showing a configuration of a control system by a negative feedback control, including a duty ratio calculation unit, according to a second embodiment of the present invention.

FIG. 8 is a diagram showing a configuration of a control system, which includes the duty ratio calculation unit 78 according to a second embodiment of the present invention, and is similar to that of FIG. 5. In FIG. 8, this duty ratio calculation unit 78 includes the first adder 81 receiving the target door speed and a negative value of the actual door speed, the proportional gain operational unit 87, the integration operational unit 83, the integral gain operational unit 84, the second adder 85, and the feedback gain operational unit 88. In this duty ratio calculation unit 78, the proportional gain of the proportional gain operational unit 82, the integral gain of the integral gain operational unit 84, and the feedback gain of the feedback gain operational unit 88 are set by the feedback gain setting unit 79.

When the target door speed VL and the actual door speed V are provided to the duty ratio calculation unit 78, the actual door speed is subtracted from the target door speed by the first adder 81. A result of the subtraction is integrated by the integration operational unit 83, and is multiplied by the positive proportional gain K2 by means of the proportional gain operational unit 87. The output of the integration operational unit 83 is multiplied by the integral gain K1 by means of the integral gain operational unit 84. The actual door speed is multiplied by the feedback gain K4 by means of the feedback gain operational unit 88. Results of the multiplications in the proportional gain operational unit 87, the integral gain operational unit 84 and the feedback gain operational unit 88 are added in the second adder 85, and a result of the addition is supplied as the duty cycle signal to the drive circuit 61.

In such a configuration as described above, the second embodiment is characterized in that the duty ratio is increased/decreased in proportion to the actual door speed by use of a value obtained by multiplying the actual door speed V by the positive feedback gain K4, thus obtaining an effect similar to that of the first embodiment mentioned above. In the first embodiment mentioned above, in the case where the actual door speed V is lowered, the duty ratio is controlled so as to be lowered instantaneously and then increased. In such a control method, follow-up capability is not preferable for the target door speed VL.

Accordingly, in this embodiment, the value proportional to the actual door speed V is subjected to the feedforward, and the proportional gain K2 and the integral gain K1, which are positive values, are used. Thus, it is possible to obtain a control system capable of operating for the load variations in a similar way to that of the first embodiment mentioned above and of following the change of the target door speed well.

Figure 9:
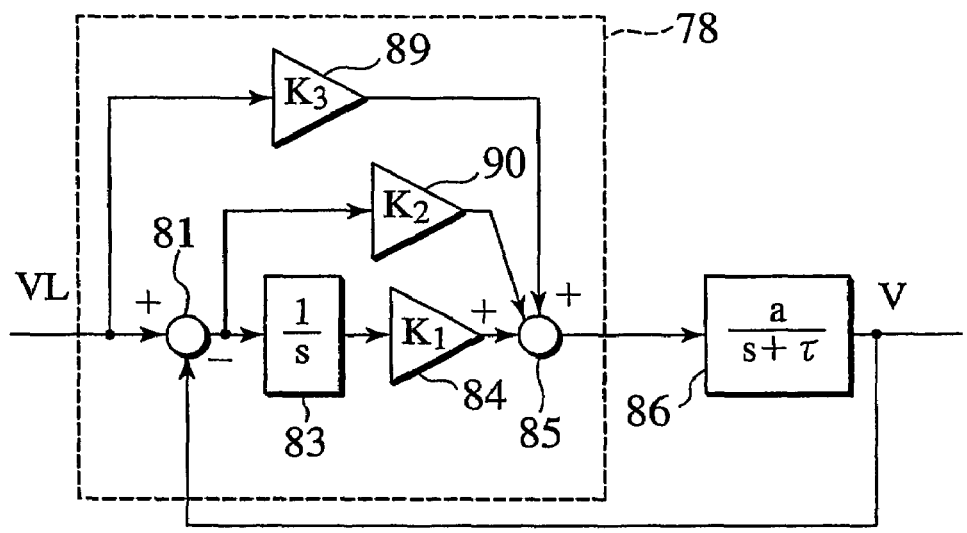
FIG. 9 is a diagram showing a configuration of a control system by a negative feedback control, including a duty ratio calculation unit, according to a third embodiment of the present.

The second embodiment described above can obtain a similar effect even if a configuration shown in FIG. 9 (third embodiment) is adopted. In comparison with the configuration shown in FIG. 8, in the configuration shown in FIG. 9, the feedback gain operational unit 88 shown in FIG. 8 is deleted, the feedforward gain operational unit 89 for multiplying the target door speed VL by the feed forward gain K3 is provided, and the proportional gain operational unit 90 for multiplying the addition result of the first adder 81 by the proportional gain K2 is provided in place of the proportional gain operational unit 87. In addition, multiplication results in the feedforward gain operational unit 89, the proportional gain operational unit 90 and the integral gain operational unit 84 are added in the second adder 85. Here, the respective gains shown in FIGS. 8 and 9 are converted as represented in the following Expressions (4) and (5). Thus, the control system configured as shown in FIG. 8 and the control system configured as shown in FIG. 9 become equivalent to each other.

$$K2=K5-K4 \tag{4}$$

$$K3=K4 \tag{5}$$

The control system having the configuration shown in the third embodiment in FIG. 9 is compared with the control system shown in the first embodiment in FIG. 5. Then, in the control system of the first embodiment, when the proportional gain K2 is set at −0.2, the responsiveness to the target value at the start of movement of the door becomes slow as in the case where the proportional gain K2 is set at 0 (as shown by the circled number 2 of FIG. 6). Besides the above, the actual door speed follows up the target door speed after the door moves in the reverse direction once. Therefore, the responsiveness at the start of the movement has been deteriorated.

As an example of the embodiment for avoiding this problem, feedforward is considered to be performed by use of the feedforward gain K3 employed in the embodiment shown in FIG. 9. For example, in the case where the feedback gain is set equal to 0.7, the proportional gain K2 is set equal to 0.5, and the integral gain K1 is set equal to 0.16, the responsiveness becomes as shown by the circled number 4 of FIG. 6. In the response characteristics shown by the circled number 4 of FIG. 6, though the responsiveness to the disturbance is completely the same as that of the circled number 3 of FIG. 6, the responsiveness of the target value at the start of the movement becomes approximate to the responsiveness shown by the circled number 1 of FIG. 6.

Figure 10:
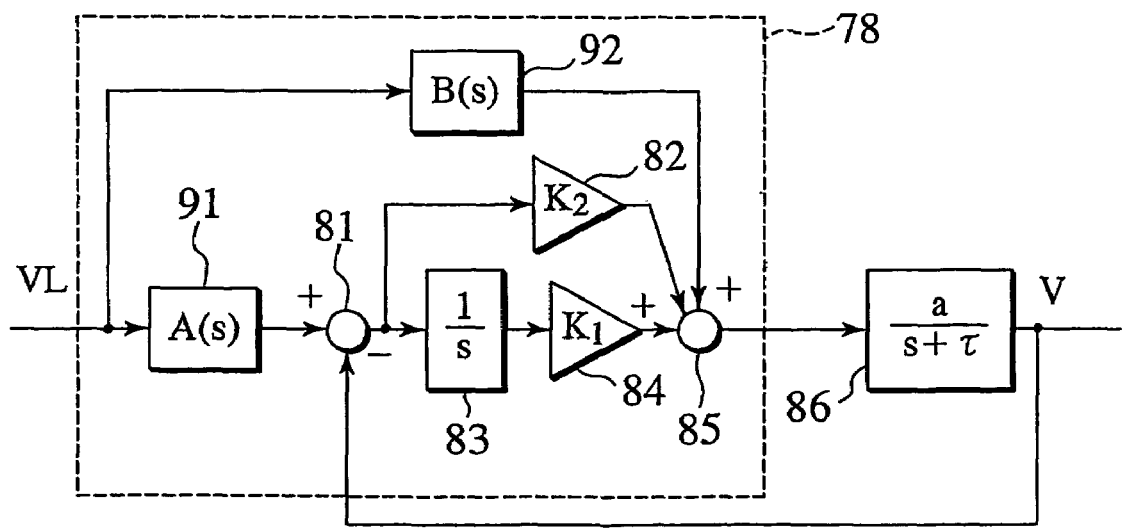
FIG. 10 is a diagram showing a configuration of a control system by a negative feedback control, including a duty ratio calculation unit, according to a fourth embodiment of the present invention.

FIG. 10 is a diagram showing a configuration of a control system, which includes the duty ratio calculation unit 78 according to a fourth embodiment of the present invention, and is similar to that of FIG. 5. In comparison with the duty ratio calculation unit 78 of the first embodiment shown in FIG. 5, the duty ratio calculation unit 78 in FIG. 10 is characterized by including a prepositioned compensator provided with the compensator 91, which supplies the target door speed VL to the first adder 81 in response characteristics to be described below, and functions as a target speed changing unit, and provided with the compensator 92, which supplies the target door speed VL to the second adder 85 in response characteristics to be described below, and functions as a compensation unit.

Assuming that responsiveness to a desired target value is obtained as a transfer function (s), the transfer function A(s) of the compensator 91 is represented as in the following Expression (6), and the transfer function B(s) of the compensator 92 is represented as in the following Expression (7).

$$A(s)=m(s) \quad (6)$$

$$B(s)=\{(s+\tau)/a\} \times m(s) \quad (7)$$

In the configuration as described above, even if the integral gain K1 and the proportional gain K2 are set at arbitrary values, for example, even if the proportional gain K2 is set at a negative value, desired response characteristics to the target value are obtained. Consequently, the speed of the door can be lowered at the time of pinching, and the target door speed can be followed up well.

Next, the processing procedure when the integral gain K1, the proportional gain K2, the feed forward gain K3 and the proportional gain K5 are set by the above-mentioned door opening/closing control unit 36 to generate the duty cycle signal in the third embodiment will be described with reference to FIGS. 11, 12 and 13.

Figure 11:
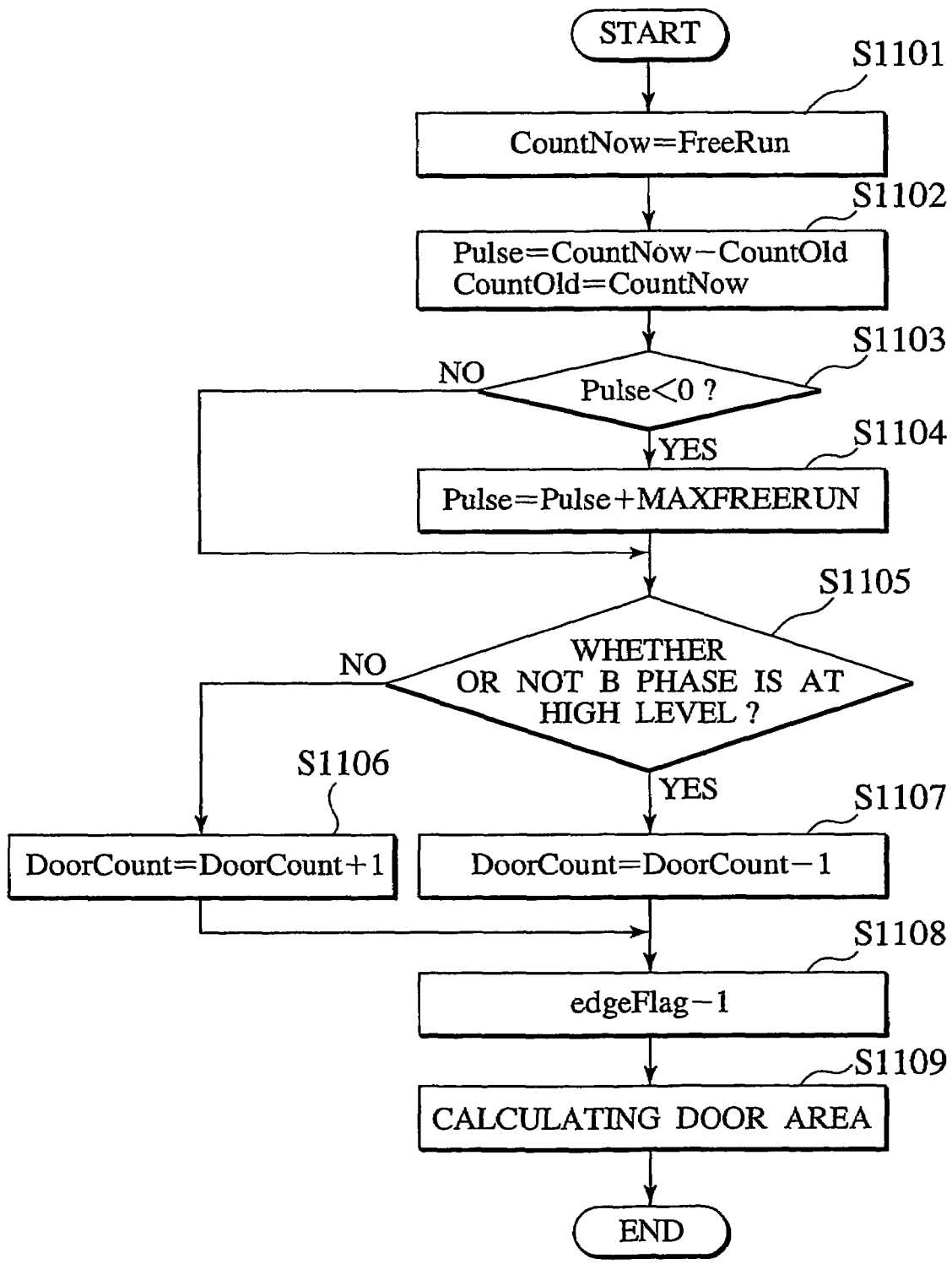
FIG. 11 is a flowchart showing a processing procedure of calculating door position information.

First, the door opening/closing control unit 36 performs processing of the flowchart shown in FIG. 11 in the door position calculation unit 74, thus calculating the moving direction and the door position of the slide door 1. Subsequently, the door opening/closing control unit 36 performs processing of the flowchart shown in FIG. 12 or 13, thus generating the duty cycle signal.

Next, a method for calculating the door position by the door position calculation unit 74 will be described with reference to FIG. 11.

In FIG. 11, when the slide door 1 actually moves and a door drive pulse is provided from the pulse encoder 47, a count value (FreeRun) of an internal free run counter is set at a current count value (CountNow) by the door position calculation unit 74 (Step S1101). For example, this free run counter is one counting the number of pulses by detecting rises of the door drive pulses from the pulse encoder 47.

Next, a difference between the previous count value and the current count value set in Step S1101 is operated by the door position calculation unit 74, a value obtained by the operation is set as a pulse value (Pulse) for obtaining the door position, and the current count value obtained in Step S1101 is changed to a previous count value (Step S1102). Then, it is determined whether or not the pulse value obtained by the operation in Step S1102 is a negative value smaller than "0" (Step S1103). When the pulse value is determined not to be smaller, the count value is used as it is in processing that follows. When the pulse value is determined to be smaller, the maximum count value of the free run counter (MAXFREERUN) and the count value obtained in Step S1102 are added together, and a value obtained by the addition is set as a count value to be used in the processing that follows (Step S1104).

Next, a voltage level of the B phase of the door opening/closing drive motor 48 is determined by the door position calculation unit 74 to determine the rotation direction of the door opening/closing drive motor 48 (Step s1105). In this case, the door position calculation unit 74 determines whether or not the voltage level of the B phase of the door opening/closing drive motor 48 is a high level. When it is determined that the voltage level is not high, the door count value is increased by "1" (Step S1106). When it is determined that the voltage level is high, the door counter value (DoorCount) indicating the moving direction of the slide door 1 is decreased by "1" (Step S1107).

Next, a value of an edge flag (edgeflag) indicating whether or not the door drive pulse is provided is set at "1" to tell that the pulse is provided (Step S1108). Then, a position (area) where the slide door 1 is present is calculated based on the pulse value obtained by the operation in Step S1102 or S1104 and the rotation direction of the door opening/closing drive motor 48, which is determined in Step S1105, and the door position information thus calculated is supplied to the target speed generation unit 77 and the feedback gain setting unit 79 (Step S1109).

In such a way, the calculated door position information is provided to the target speed generation unit 77 and the feedback gain setting unit 79. Furthermore, processing shown in FIG. 12 is started in a predetermined cycle when the processing is executed (for example, every 50 msec).

Figure 12:
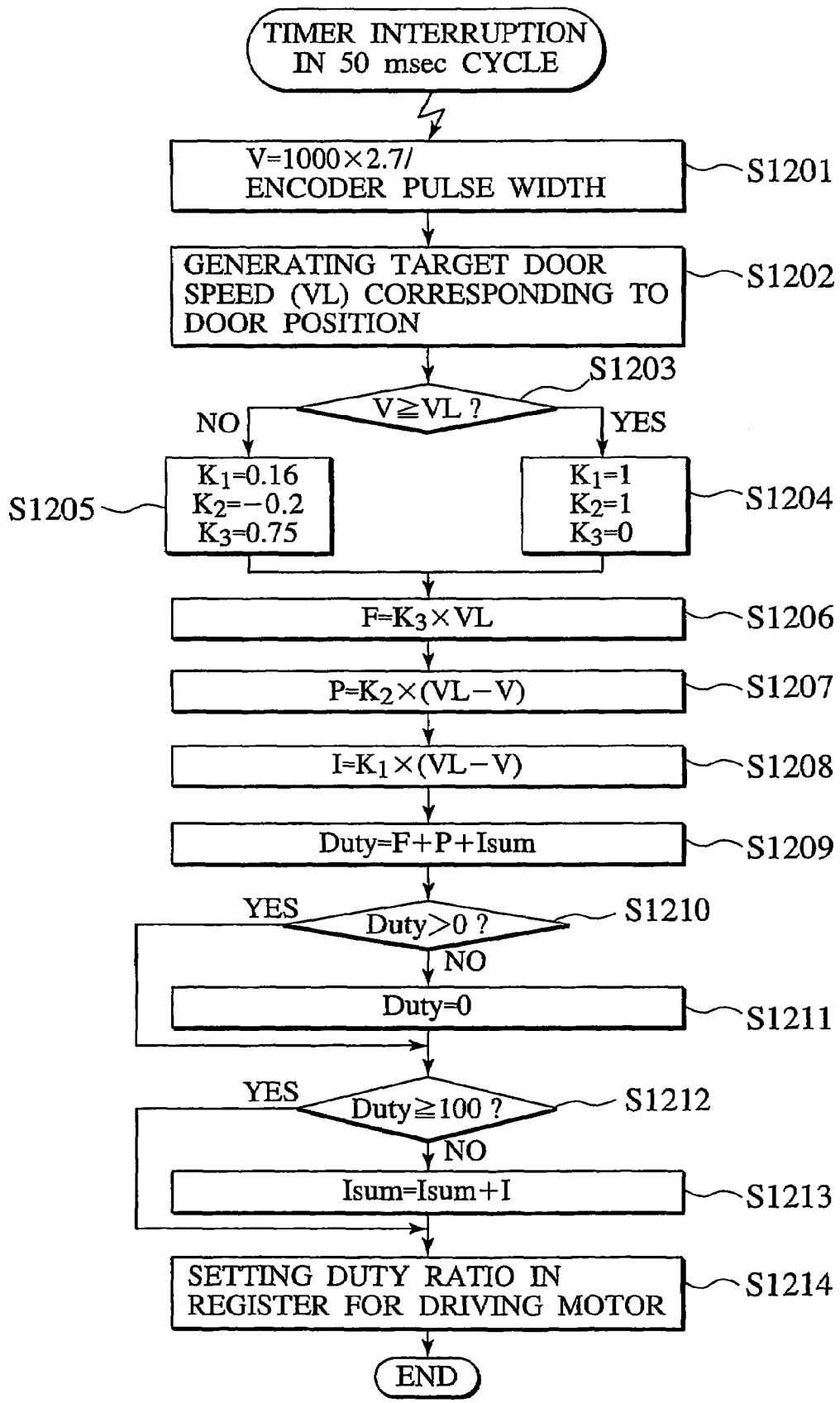
FIG. 12 is a flowchart showing a processing procedure of calculating a duty ratio.

FIG. 12 is a flowchart showing a procedure in the case of realizing processing of generating the duty cycle signal according to a fifth embodiment of the present invention by, for example, a microcomputer.

In FIG. 12, first, an operation of (1000×2.7 (electrode interval)/pulse width of encoder) is performed in the speed calculation unit 75, and the actual door speed V is obtained (Step S1201). Note that the above-described calculation expression for the actual door speed V is a mere example and can be changed appropriately in accordance with the electrode interval of the encoder and the like. Subsequently, the target door speed VL corresponding to the door position calculated by the door position calculation unit 74 in the above-described manner is generated in the target speed generation unit 77 and supplied to the duty ratio calculation unit 78 (Step S1202).

Next, the actual door speed V and the target door speed VL are compared with each other in the feedback gain setting unit 79 (Step S1203). If V is equal to/larger than VL, then, for example, the integral gain K1 is set equal to 1, the proportional gain K2 is set equal to 1, and the feedback gain K3 is set equal to 0 (Step S1204). If V is smaller than VL, then, for example, the integral gain K1 is set equal to 0.16, the proportional gain K2 is set equal to −0.2, and the feedback gain K3 is set equal to 0.75 (Step S1205). Subsequently, in the duty ratio calculation unit 78, the target door speed VL is multiplied by the feedback gain K3 (Step S1206), (VL−V) is multiplied by the proportional gain K2 (Step S1207), and (VL−V) is multiplied by the integral gain K1 (Step S1208). Then, the duty ratio calculation unit 78 adds, by the second adder 85, a result of the multiplication (F) obtained in Step S1206, a result of the multiplication (P) obtained in Step S1207 and an integral value (Isum) of a result of the multiplication (I) obtained in Step S1208. Thus, the duty ratio calculation unit 78 obtains the duty ratio (Duty) (Step S1209).

Next, the duty ratio calculation unit 78 determines whether or not the duty ratio obtained in Step S1209 is 0% or more (Step S1210). When the duty ratio is determined to be 0% or more, the processing proceeds to Step S1212. When the duty ratio is determined not to be 0% or more, the duty ratio is set at 0%.

Next, the duty ratio calculation unit 78 determines whether or not the duty ratio obtained in Step S1209 is 100% or more. Specifically, it is determined whether or not the actual door speed V exceeds the target door speed VL. When the duty ratio is determined to be 100% or more, the processing proceeds to Step S1214. When the duty ratio is determined not to be 100% or more, the multiplication value (I) obtained in Step S1208 is added to the integral value (Isum), and thus a new integral value is obtained (Step S1213). Finally, the duty ratio calculation unit 78 sets the duty ratio of the integral value obtained in Step S1213 in a register for driving a motor (unillustrated) of the drive circuit 61(S1214).

In the above-described processing procedure shown in FIG. 12, the feedback gain setting unit 79 sets the proportional gain K2 at a positive value in the case where the actual door speed V exceeds the target door speed VL, that is, in the case where (VL-V) is negative. In accordance with the set proportional gain K2, the integral gain K1 and the feedback gain K3 are set. Thus, the duty ratio is reduced rapidly as usual feedback control, thus making it possible to attain the lowering of the actual door speed V. Consequently, for example, when the vehicle is stopped on a downhill slope, in the case where the actual door speed exceeds the target door speed, and in the case where the actual door speed is slightly lowered than the target door speed due to swing resistance, the actual door speed can be made to follow up the target door speed rapidly.

Figure 13:
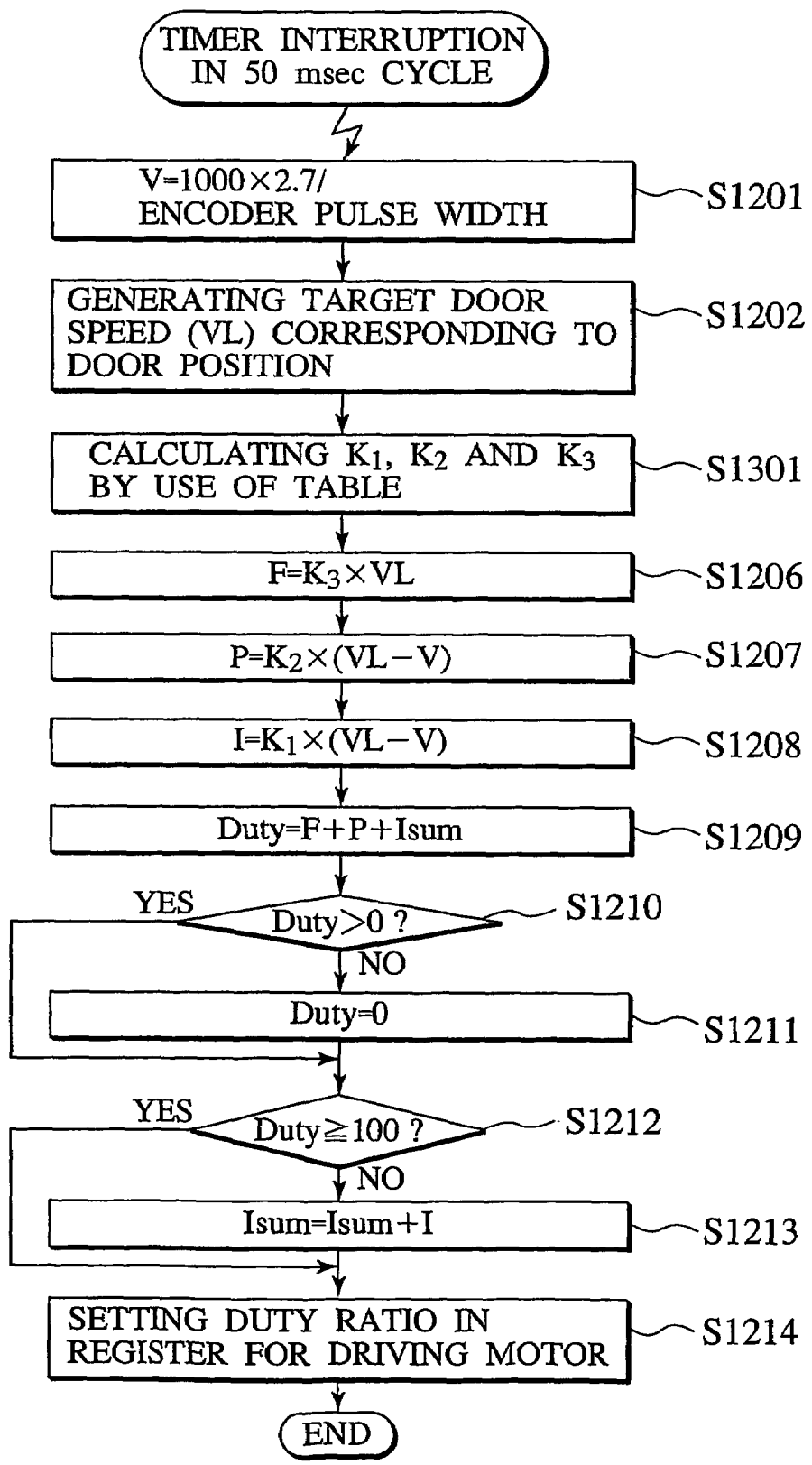
FIG. 13 is a flowchart showing another processing procedure of calculating the duty ratio.

FIG. 13 is a flowchart showing a procedure in the case of realizing processing of generating the duty cycle signal according to a sixth embodiment of the present invention by, for example, a microcomputer. This processing procedure is characterized in the following points including a replacement for the processing procedure shown in FIG. 12. Specifically, Step S1301 of setting the integral gains K1, the proportional gains K2 and the feedforward gains K3 based on the door positions, the actual door speeds and the target door speeds by use of Table 1 shown in FIG. 14 is performed in place of the processing of Steps S1203, S1204 and S1205 shown in FIG. 12.

In Table 1 shown in FIG. 14, the integral gains K1, the proportional gains K2 and the feedback gains K3 are set in accordance with the door positions (10 mm, 300 mm, 600 mm) with the properly shut position taken as a reference and magnitude relationships (VL-V≦-2,-2<VL-V & VL-V<10, 10<VL-V) between the actual door speeds V and the target door speeds VL.

In the processing shown in FIG. 13, as shown in Table 1 of FIG. 14, all of the integral gains K1, the proportional gains K2 and the feedback gains K3 are changed in accordance with the values of (VL-V) and the door positions. Thus, the proportional gain K2 is set negative only when the pinching occurs and the value of (VL-V) is significantly increased, and thus the actual door speed V is lowered positively. Furthermore, in the case where the value of (VL-V) is small in both positive and negative, the actual door speed V can be made to coincide with the target door speed VL rapidly while setting the proportional gain K2 positive. Moreover, not only the proportional gain K2 but also the integral gain K3 is set at the optimum value for the value of the proportional gain K2. Therefore, for convergence characteristics to the target door speed VL, desired characteristics, for example, critical braking characteristics, can be used. In addition, the change of the gains depending on the door position enables the gains to be changed, for example, at a door position where the pinching may occur and at a door position where the pinching may not occur. Thus, appropriate control can be performed.

Note that, in the sixth embodiment described above, though all of the integral gain K1, the proportional gain K2 and the feedforward gain K3 are decided on the basis of the opening/closing position of the door, it is satisfactory that at least one gain is selected from the gains described above.

Moreover, in the embodiments described with reference to the flowcharts of FIGS. 12 and 13, the gains K1, K2 and K3 are set on the basis of the door position, the door speed and the target door speed. However, in the case of configuring the control system as shown in FIG. 8, it is satisfactory that the gains K1, K4 and K5 are set in place of the gains K1, K2 and K3.

As described above, according to the present invention, the actual speed of the opening/closing body is lowered to an extent enough to reduce the influence of the load, thus making it possible to attain the reduction of the pinching load.

Japanese Patent Application No. 2002-241845, filed on Aug. 22, 2002, is incorporated herein by reference in its entirety.

The invention claimed is:

1. A control device for a vehicular opening/closing body, comprising:
   an actual speed detecting unit for detecting an actual opening/closing body speed which is an actual opening/closing speed of the vehicular opening/closing body provided in a vehicle;
   a target speed generating unit for generating a target opening/closing body speed which is a target opening/closing speed of the vehicular opening/closing body;
   a duty ratio calculating unit for obtaining a speed difference between the target opening/closing body speed generated by the target speed generating unit and the actual opening/closing body speed detected by the actual speed detecting unit, and for calculating, by use of the obtained speed difference, a duty ratio when power supplied to a motor driving to open/close the vehicular opening/closing body is subjected to duty control; and
   a gain setting unit for setting a gain for use in calculating the duty ratio by the duty ratio setting unit,
   wherein the duty ratio calculating unit calculates the duty ratio based on an addition result obtained by adding a first multiplication value in which the speed difference is multiplied by a negative proportional gain, and a second multiplication value in which an integral value of the speed difference is multiplied by an integral gain.

2. The control device for a vehicular opening/closing body according to claim 1,
   wherein the gain setting unit sets the proportional gain at a negative value only when the speed difference is equal to a predetermined value or more.

3. A control device for a vehicular opening/closing body, comprising:
   an actual speed detecting unit for detecting an actual opening/closing body speed which is an actual opening/closing speed of the vehicular opening/closing body provided in a vehicle;
   a target speed generating unit for generating a target opening/closing body speed which is a target opening/closing speed of the vehicular opening/closing body;
   a duty ratio calculating unit for obtaining a speed difference between the target opening/closing body speed generated by the target speed generating unit and the actual opening/closing body speed detected by the actual speed detecting unit, and for calculating, by use of the obtained speed difference, a duty ratio when power supplied to a motor driving to open/close the vehicular opening/closing body is subjected to duty control; and a gain setting unit for setting a gain for use in calculating the duty ratio by the duty ratio setting unit, wherein the duty ratio calculating unit calculates the duty ratio based on an addition result obtained by adding a first multiplication value in which the speed difference is multiplied by a proportional gain, a second multiplication value in which an integral value of the speed difference is multiplied by an integral gain, and a third multiplication value in which the actual opening/closing body speed is multiplied by a positive feedback gain.

4. A control device for a vehicular opening/closing body, comprising:

an actual speed detecting unit for detecting an actual opening/closing body speed which is an actual opening/closing speed of the vehicular opening/closing body provided in a vehicle;

a target speed generating unit for generating a target opening/closing body speed which is a target opening/closing speed of the vehicular opening/closing body;

a duty ratio calculating unit for obtaining a speed difference between the target opening/closing body speed generated by the target speed generating unit and the actual opening/closing body speed detected by the actual speed detecting unit, and for calculating, by use of the obtained speed difference, a duty ratio when power supplied to a motor driving to open/close the vehicular opening/closing body is subjected to duty control; and a gain setting unit for setting a gain for use in calculating the duty ratio by the duty ratio setting unit, wherein the duty ratio calculating unit calculates the duty ratio based on an addition result obtained by adding a first multiplication value in which the speed difference is multiplied by a proportional gain, a second multiplication value in which an integral value of the speed difference is multiplied by an integral gain, and a third multiplication value in which the target opening/closing body speed is multiplied by a positive feedback gain.

5. The control device for a vehicular opening/closing body according to claim 1, further comprising a prepositioned compensator including a target speed conversion unit and a compensation unit, the target speed conversion unit receiving the target opening/closing body speed and supplying the target opening/closing body speed in predetermined response characteristics, and the compensation unit supplying a value calculated on the basis of the target opening/closing body speed such that the predetermined characteristics are realized, wherein the duty ratio calculating unit calculates the first multiplication value and the second multiplication value based on a speed difference between the target speed supplied from the target speed conversion unit and the actual opening/closing body speed, and calculates the duty ratio by adding an output of the compensation unit to a result of the calculation for the first multiplication value and the second multiplication value.

6. The control device for a vehicular opening/closing body according to claim 1, further comprising a position detecting unit for detecting an opening/closing position of the opening/closing body, wherein the gain setting unit sets at least one of the integral gain and the proportional gain based on the opening/closing position of the opening/closing body, the position being detected by the position detecting unit.

7. The control device for a vehicular opening/closing body according to claim 3, further comprising a position detecting unit for detecting an opening/closing position of the opening/closing body, wherein the gain setting unit sets at least one of the integral gain, the proportional gain and the positive feedback gain based on the opening/closing position of the opening/closing body, the position being detected by the position detecting unit.

8. The control device for a vehicular opening/closing body according to claim 1, further comprising a position detecting unit for detecting an opening/closing position of the opening/closing body, wherein the target speed generating unit generates the target speed based on the opening/closing position detected by the position detecting unit.

9. A control device for a vehicular opening/closing body, comprising:

actual speed detecting means for detecting an actual opening/closing body speed which is an actual opening/closing speed of the vehicular opening/closing body provided in a vehicle;

target speed generating means for generating a target opening/closing body speed which is a target opening/closing speed of the vehicular opening/closing body;

duty ratio calculating means for obtaining a speed difference between the target opening/closing body speed generated by the target speed generating means and the actual opening/closing body speed detected by the actual speed detecting means, and for calculating, by use of the obtained speed difference, a duty ratio when power supplied to a motor driving to open/close the vehicular opening/closing body is subjected to duty control; and gain setting means for setting a gain for use in calculating the duty ratio by the duty ratio setting means, wherein the duty ratio calculating means calculates the duty ratio based on an addition result obtained by adding a first multiplication value in which the speed difference is multiplied by a negative proportional gain, and a second multiplication value in which an integral value of the speed difference is multiplied by an integral gain.

* * * * *